March 25, 1958  D. P. FISHER  2,827,918
MASTER CYLINDER CHECK VALVE
Filed March 26, 1953  2 Sheets-Sheet 1

INVENTOR.
Delbert P. Fisher
BY
His Attorney

March 25, 1958

D. P. FISHER 2,827,918

MASTER CYLINDER CHECK VALVE

Filed March 26, 1953

INVENTOR.
Delbert P. Fisher
BY
His Attorney

United States Patent Office 2,827,918
Patented Mar. 25, 1958

2,827,918

MASTER CYLINDER CHECK VALVE

Delbert P. Fisher, Birmingham, Mich., assignor to General Motors Corporation, Detroit, Mich., a corporation of Delaware Application March 26, 1953, Serial No. 344,854

7 Claims. (Cl. 137—493.8)

This invention relates to check valve structures used in the master cylinder of a hydraulic brake system, the check valve structures being adapted to provide for substantially free flow of hydraulic fluid to the wheel cylinders of the brakes during application of the brakes, and to provide for holding of a minimum pressure in the brake lines between the master cylinder and the wheel cylinders when the brakes are released.

It is therefore an object of this invention to provide a less expensive and more reliable check valve structure for use in master cylinders of hydraulic brake systems.

It is also an object of the invention to provide a check valve structure in a master cylinder that will as far as possible eliminate entrapment of air in the brake lines.

It is another object of the invention to provide an improved check valve structure for a master brake cylinder wherein a single resilient valve member forms a dual function of controlling flow of fluid in either direction therethrough, and which valve member can readily be removed from the assembly for replacement.

Further objects and advantages of the present invention will be apparent from the following description, reference being had to the accompanying drawings wherein a preferred form of the invention is clearly shown.

Figures 1, 3, 4:
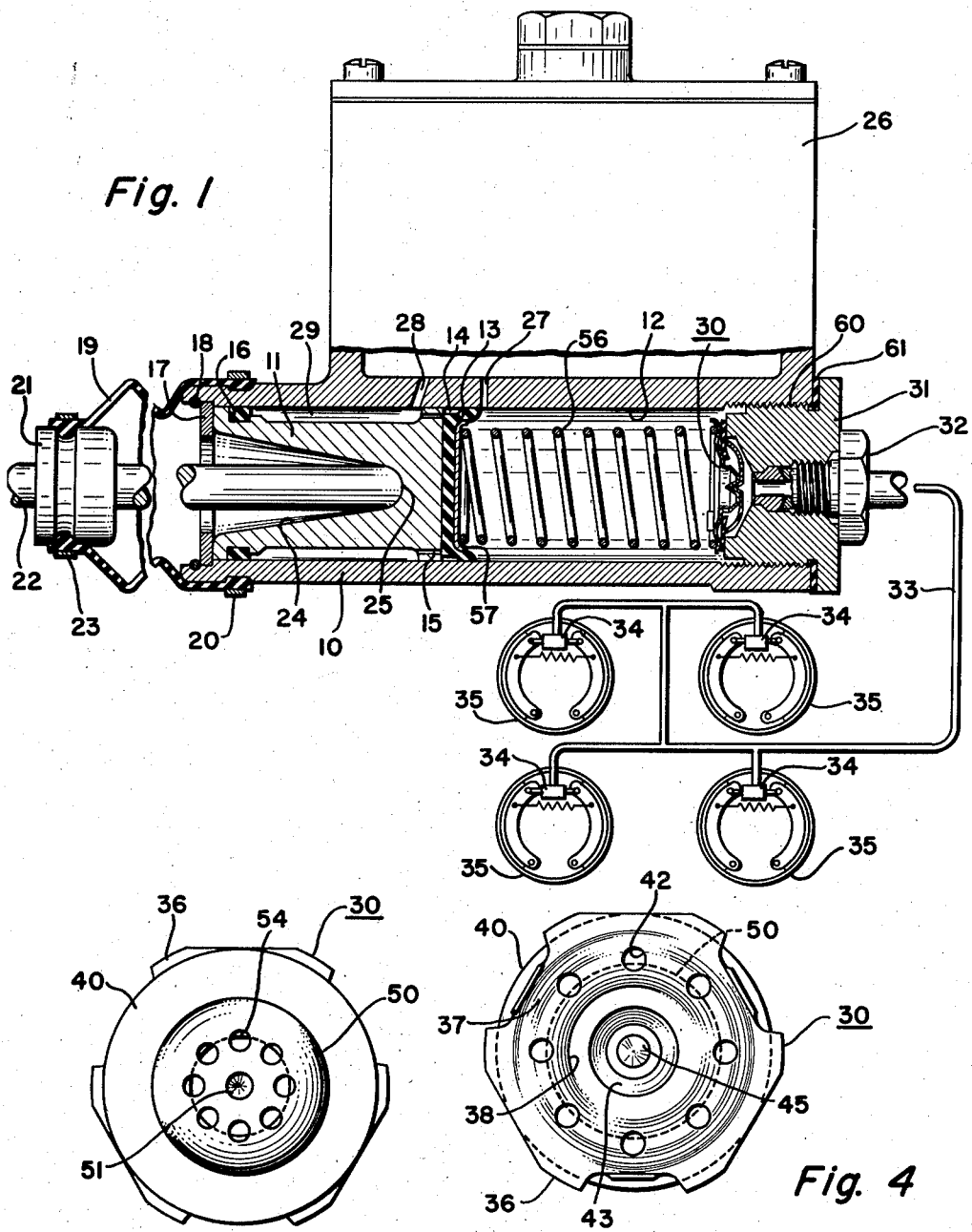
Figure 1 is a cross sectional view of a master cylinder of a hydraulic brake system incorporating the check valve structure of this invention, and connected diagrammatically to a hydraulic brake system.
Figure 3 is an elevational view of the check valve structure as viewed from the right hand side of Figure 2.
Figure 4 is an elevational view of the check valve structure as viewed from the left hand side of the device of Figure 2.

In Figure 1 there is illustrated a conventional master cylinder incorporating the check valve structure of this invention, the master cylinder being connected diagrammatically with a hydraulic brake system. The master cylinder for the brake system comprises the cylinder 10 having a master cylinder piston 11 slidable within the cylinder bore 12 of the cylinder 10. The piston 11 comprises a forward seal 13 that is suitably secured to the forward end of the piston 11. An annular groove 14 is provided in the forward seal 13, the seal 13 covering the ports 15 in the forward end of the piston 11.

The piston 11 is also provided with a rear seal 16 and is adapted to engage a stop member 17 secured within the cylinder 10 by means of a snap ring 18.

The rearward end of the cylinder 10 is closed by means of a flexible rubber-like boot 19 that has one end thereof engaging the outer periphery of the cylinder 10 and secured thereto by a clamping strap 20. The opposite end of the boot 19 engages an enlargement 21 secured to the pedal actuated rod 22, a clamping strap 23 securing this end of the boot 19 to the enlargement 21.

The pedal actuated rod 22 extends into a recess 24 provided in the piston 11 and has the forward end thereof seating in the end 25 of the recess 24.

A reservoir 26 is secured to or is a part of the cylinder 10, the liquid contained in the reservoir 26 replenishing the fluid in the hydraulic system to make up for any loss therein. A vent port 27 is provided in the wall of the cylinder 10 communicating with the interior of the reservoir 26 from within the cylinder bore 12 when the piston 11 is in its rear position, as illustrated in Figure 1. The vent port 27 provides for exhaust of any high pressure liquid from within the cylinder bore 12 when the piston is in its fully retracted position, thus relieving pressure from within the cylinder bore 12 when the brake system is inactive. This permits operation of the check valve as will be hereinafter described.

A port 28 in the wall of the cylinder 10 also connects between the reservoir 26 and the annular chamber 29 around the piston 11 for supply of fluid through the ports 15 and around the periphery of the forward seal 13 during retraction of the master cylinder piston 11 to provide for refilling of the cylinder bore 12 ahead of the piston 11 during the retraction movement thereof to make up for any loss of fluid.

Hydraulic fluid is delivered from within the cylinder bore 12 by the piston 11 through a check valve 30 that is supported upon a coupling member 31. A passage 32 is provided in the coupling member 31 for delivery of hydraulic fluid into the brake line 33 and for return of fluid from the brake system. The brake line 33 connects with the wheel cylinders 34 of the wheel brakes 35, and operates the hydraulic brakes in conventional manner.

Figure 2:
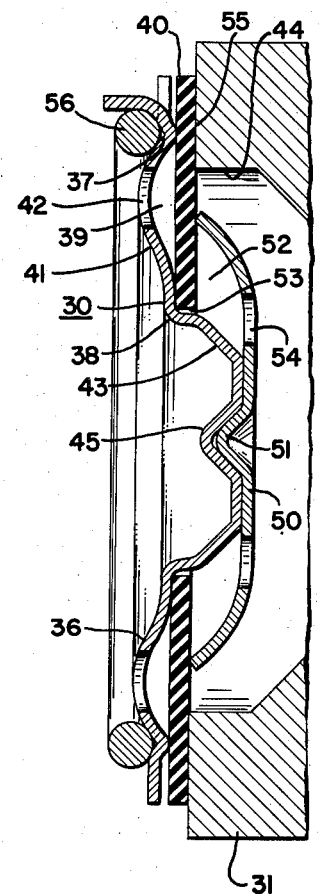
Figure 2 is an enlarged cross sectional view of the check valve structure of this invention.

The check valve 30 is more particularly illustrated in Figure 2, and other figures. The check valve 30 comprises a first disc-like member 36 that has a pair of spaced annular seats 37 and 38. The portion of the disc-like member 36 between the spaced annular seats 37 and 38 is formed arcuately to provide a chamber 39 between the disc-like member 36 and the flexible valve annulus 40 that engages the seats 37 and 38.

The arcuate portion 41 forming the chamber 39 is provided with a plurality of passages 42 for flow of hydraulic fluid from the cylinder bore 12 into the chamber 39.

The disc-like member 36 has a centrally raised portion 43 that extends into a shallow recess 44 provided in the coupling member 31. The raised portion 43 has a dimple 45 depressed into the same to provide for centralization and attachment of a second disc-like member 50 thereto.

The second disc-like member 50 has a dimpled portion 51 engaging the dimpled portion 45 of the member 36, the apices of the dimpled portions providing for a spot weld connection between the members 36 and 50.

The second disc-like member 50 is substantially dish-shaped and has the major portion thereof spaced axially from the disc-like member 36 whereby to provide a chamber 52 between the disc-like member 50 and the flexible valve annulus 40 into which fluid flows from the chamber 39 around the inner periphery 53 of the valve annulus 40. The disc member 50 has a plurality of passages 54 through the same to provide for flow of fluid from the chamber 52 into the recess 44 and thence into the brake line 33.

The flexible valve annulus 40 engages an annular seat portion 55 provided around the periphery of the shallow recess portion 44. The valve annulus 40 is retained upon the seat 55 on the coupling member 31 by means of a compression spring 56 that has one end thereof engaging a spring seat 57 substantially aligned with the outer seat 37 on the disc member 36, the opposite end of the compression spring 56 engaging the forward end of the piston 11, and specifically being held in a cup 57 positioned on the forward seal 13 on the piston 11.

The coupling member 31 is secured to the forward end of the cylinder bore 12 by a threaded connection, a gasket 61 being provided to prevent liquid leakage through the threaded connection 60.

It will be observed from the placement of check valve 30 within the recess 44 in the coupling member 31 that a minimum volume of open space is provided in which air could be entrapped between the check valve 30 and the brake line passage 32. In fact, during operation of the check valve 30, the valve annulus 40 will be lifted from the seat 55 whereby any air within the brake line 33 and in the recess 44 will be discharged into the cylinder bore 12 by return flow of hydraulic fluid from the brake cylinders 34.

In operation, when the brakes are to be applied, the piston 11 will be moved in rightward direction. This will first close the vent port 37 whereafter fluid trapped within the cylinder bore 12 will be forced into the brake line 33 through the passage 42, the chamber 39, around the inner periphery of the valve annulus 40, the chamber 52 and passage 54 into the recess 44 connecting with the brake line 33. The flow of hydraulic fluid in this direction during application of the brakes 35 to expand the brake cylinders 34 will be substantially free, the inner peripheral portion of the annulus 40 causing no substantial restriction to the flow of fluid.

When the brakes are released by allowing the piston 11 to move in leftward direction, fluid contained within the wheel cylinders 34 will then flow through the brake line 33 into the recess 44. At this time the inner peripheral portion of the valve annulus 40 will seat and seal upon the seat 38 thereby preventing return flow of fluid through the chamber 39 and passage 42 into the cylinder bore 12. As the pressure is reduced within the cylinder bore 12 by retraction movement of the piston 11, the fluid pressure in the recess 44 will ultimately overcome the effect of the compression spring 56 holding the valve annulus on the seat 55, whereupon the valve annulus 40 will lift from its seat 55 to permit return flow of hydraulic fluid from the brake line 33 into the cylinder bore 12 between the outer peripheral portion of the valve annulus and the seat 55.

However, whenever the fluid pressure in the brake line 33 reaches a minimum value equivalent to that of the value of the spring compression applied through the spring 56, the valve annulus 40 will close upon its seat 55, thereby retaining a minimum pressure in the brake line 33 at all times. This minimum pressure is retained in the brake line to prevent introduction of air into the wheel cylinders 34.

Figure 5:
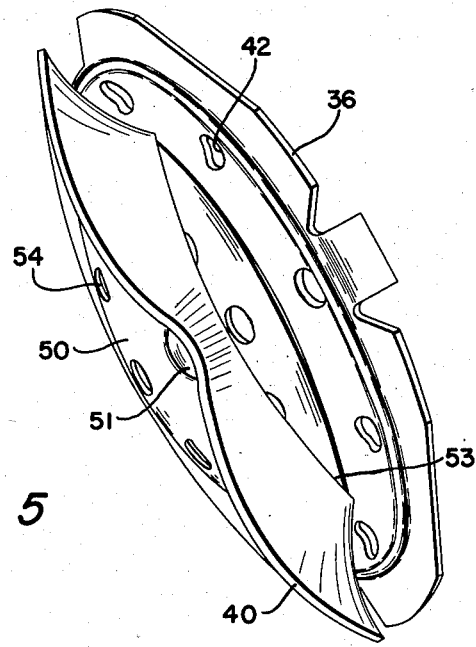
Figure 5 is a perspective elevational view of the check valve structure illustrating the manner of removal of the flexible valve element.
Figure 6:
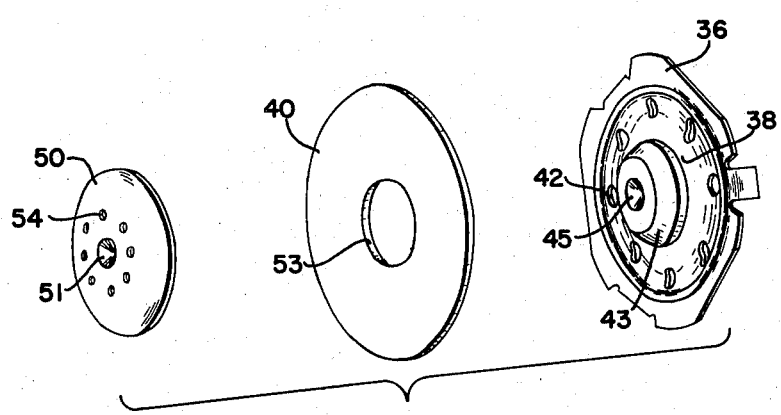
Figure 6 is an exploded perspective view of the parts of the check valve structure in position for assembly.

The valve annulus is free and unattached relative to the disc members 36 and 50 to provide for both axial and rotational freedom. The flexible valve annulus 40 is preferably constructed of a rubber-like material that is resistant to the brake fluid, the valve annulus 40 being removable from between the disc members 36 and 50 in the manner illustrated in Figure 5. This permits replacement of the valve annulus and eliminates the necessity of replacing the entire valve assembly, thus reducing maintenance cost.

While the form of embodiment of the invention as herein disclosed constitutes a preferred form, it is to be understood that other forms might be adopted as may come within the scope of the claims which follow.

What is claimed is as follows:

1. A check valve unit assembly for a master cylinder of a hydraulic brake system, comprising, a first disk-like member having a pair of radially spaced annular seats on one side thereof and fluid passage means disposed between the seats, a flexible valve annulus engaging on one side thereof said seats to close said passage means against fluid flow in one direction, a second disk-like member secured to said first disk member centrally thereof with the major part of the second disk member spaced axially from the first member with the periphery of the second disk member disposed in spaced relation to said first disk member and positioned between said seats and engaging the opposite side of said valve annulus between its inner and outer edge peripheries and over which the inner peripheral portion of said annulus flexes toward said second disk member, and passage means in said second disk providing for fluid flow from between the said disks through said valve annulus and said second disk.

2. A check valve unit assembly for a master cylinder of a hydraulic brake system, comprising, a first disk-like member having a pair of radially spaced annular seats on one side thereof and fluid passage means through the disk positioned between the seats, a second disk-like member secured to said first member substantially centrally thereof with the major part of the second disk member spaced axially from said first disk member with the periphery of the second disk member extending toward the first disk member and disposed between said seats in spaced relationship to said first disk member, and a flexible flat valve annulus positioned between said first disk member and said second disk member with one side thereof engaging both said seats of said first member to close said passage means therein against fluid flow in one direction and the opposite side engaging the periphery of the second disk with the said periphery disposed between the inner and outer peripheral edges of said valve annulus for flexing of the inner peripheral portion of the said annulus thereover toward the second disk, said valve annulus having freedom of movement relative to said disks rotationally and axially thereof, said second disk having passage means radially inwardly of the inner periphery of the valve annulus providing for fluid flow from between said disks through said valve annulus and said second disk with the valve annulus flexed toward said second disk.

3. A check valve in accordance with claim 2 wherein the first disk member includes an annular recess extending inwardly from the face thereof opposite to that providing said seats substantially aligned with the outer of said radially spaced seats and forming thereby a seat to receive a spring.

4. A check valve unit assembly for a master cylinder of a hydraulic brake system, comprising, a first disk-like member having a pair of radially spaced annular seats on one side thereof and having a contour between the seats to provide a fluid receiving chamber and having fluid passage means through the contoured portion between the seats for flow of fluid into the said receiving chamber, a second disk-like member secured to said first member substantially centrally thereof with the major part of the second disk member spaced axially from said first disk member with the periphery of the second disk member disposed between said seats and having a contour extending toward the first disk member but in spaced relationship to the first disk member and forming thereby a second fluid receiving chamber, said second disk member having passage means therein for fluid flow from the said second fluid receiving chamber, and a flexible valve annulus positioned between said first disk member and said second disk member normally to separate said fluid receiving chambers when unflexed with one side thereof engageable with said seats to close said passage means in said first disk member against fluid flow in one direction and the opposite side engageable with the periphery of the second disk member to flex thereover into said second fluid receiving chamber for flow of fluid from the first fluid receiving chamber into the second fluid receiving chamber through said annulus.

5. A check valve unit assembly for a master cylinder for a hydraulic brake system, comprising, a first disk-like member having a pair of radially spaced annular seats on one side thereof and having a contour between the seats to provide a fluid receiving chamber and having fluid passage means through the contoured portion between the seats for flow of fluid into the said receiving chamber, said first disk member having a centrally raised portion within the periphery of the inner of said seats and projecting from the same side as said seats, a second disk-like member secured to said first member substantially centrally thereof on the said raised portion to axially space said second disk member from said first disk member, said second disk member having the periphery thereof disposed between said seats and having a contour extending toward the first disk member but in spaced relationship to the first disk member and forming thereby a dish shaped element providing a second fluid receiving chamber, said second disk member having passage means therein for fluid flow from the said second fluid receiving chamber, and a flexible flat valve annulus positioned between said first disk member and said second disk member and encircling said raised portion on said first disk member normally to separate said fluid receiving chambers when unflexed with one side thereof engageable with said seats to close said passage means in said first disk member against fluid flow in one direction and the opposite side engageable with the periphery of the second disk member to flex thereover into said second fluid receiving chamber for flow of fluid from the first fluid receiving chamber into the second fluid receiving chamber through said annulus when flexed into said second fluid receiving chamber.

6. A double acting check valve for a hydraulic cylinder providing for substantially free fluid flow therethrough in one direction and restricted fluid flow therethrough in the opposite direction, comprising in the combination, a body member having a wall, said wall having a recess in one face thereof and an annular valve seat on said face encircling said recess, said wall having passage means therein extending from said recess for flow of fluid, a flexible valve annulus having one side thereof engaging said seat, a first disk-like member having a pair of radially spaced annular seats engaging the valve annulus on the opposite side thereof the outer of which seats is positioned over the valve seat on said face, passage means through the first disk member between the annular seats thereof for flow of fluid to said recess, a second disk-like member disposed within said recess and secured to said first member centrally thereof with the major part of the second disk member spaced axially from the first disk member with the periphery of the second disk member positioned between said radially spaced seats of the first disk member and having an edge contour extending toward said first disk member engageable by said valve annulus to flex thereover toward said second disk member for substantially free flow of fluid in the direction of flexing of said annulus, said second disk member having passage means therein for flow of fluid from between the said disks through said annulus and said second disk member, and spring means engaging said first disk member resiliently urging said valve annulus in engagement with said seat on said wall face for restricted flow of fluid against the action of said spring.

7. A double acting check valve for a hydraulic cylinder providing for substantially free fluid flow therethrough in one direction and restricted fluid flow therethrough in the opposite direction, comprising in the combination, a body member having a wall, said wall having a recess in one face thereof and an annular valve seat on said face encircling said recess, said wall having passage means therein extending from said recess for flow of fluid, a flexible valve annulus having one side thereof engaging said seat, a first disk-like member having a pair of radially spaced annular seats engaging the valve annulus on the opposite side thereof the outer of which seats is positioned over the valve seat on said face, passage means through the first disk member between the annular seats thereof for flow of fluid to said recess, said first disk member having a centrally raised projection extending into said recess and encircled by said valve annulus for axial positioning of the valve annulus relative to the said disk member, a second disk-like member positioned within said recess and secured to said centrally raised projection and having a generally dish shaped contour with the peripheral edge thereof extending toward said first disk member and disposed between the radially spaced seats of the first disk member and engageable by said valve annulus to flex thereover toward said second disk member for substantially free flow of fluid in the direction of flexing of said annulus, said valve annulus being free for rotation and axial movement relative to said disk members, said second disk member having passage means therein for flow of fluid from between said disks through said annulus and said second disk member, and spring means engaging said first disk member resiliently urging said valve annulus in engagement with said seat on said wall face for restricted flow of fluid against the action of said spring.

References Cited in the file of this patent

UNITED STATES PATENTS

| Number | Name | Date |
|---|---|---|
| 1,941,048 | Punte | Dec. 26, 1933 |
| 2,133,575 | Rosenberg | Oct. 18, 1938 |
| 2,135,004 | Heidloff | Nov. 1, 1938 |
| 2,406,502 | Lines | Aug. 27, 1946 |
| 2,542,254 | Lamb | Feb. 20, 1951 |
| 2,646,063 | Hayes | July 21, 1953 |
| 2,663,540 | Erickson | Dec. 22, 1953 |